(12) United States Patent
Harris et al.

(10) Patent No.: US 8,065,249 B1
(45) Date of Patent: Nov. 22, 2011

(54) GPSTP WITH ENHANCED AGGREGATION FUNCTIONALITY

(76) Inventors: Curtis L. Harris, Albuquerque, NM (US); James H. Burkhard, Oakland, CA (US)

(*) Notice: Subject to any disclaimer, the term of this patent is extended or adjusted under 35 U.S.C. 154(b) by 1075 days.

(21) Appl. No.: 11/871,885

(22) Filed: Oct. 12, 2007

Related U.S. Application Data

(60) Provisional application No. 60/829,474, filed on Oct. 13, 2006.

(51) Int. Cl.
  *G06F 17/00* (2006.01)
  *G06N 5/00* (2006.01)
(52) U.S. Cl. ............... 706/45; 706/47; 706/62
(58) Field of Classification Search .............. None
  See application file for complete search history.

(56) References Cited

U.S. PATENT DOCUMENTS

| | | | |
|---|---|---|---|
| 3,358,270 A | 12/1967 | Crew et al. |
| 4,094,001 A | 6/1978 | Miller |
| 4,451,901 A | 5/1984 | Wolfe et al. |
| 4,531,201 A | 7/1985 | Skinner, Jr. |
| 4,625,295 A | 11/1986 | Skinner |
| 4,747,072 A | 5/1988 | Robinson et al. |
| 4,760,523 A | 7/1988 | Yu et al. |
| 5,051,947 A | 9/1991 | Messenger et al. |
| 7,392,229 B2 | 6/2008 | Harris et al. |
| 2002/0032670 A1 | 3/2002 | Watanabe et al. |
| 2002/0059152 A1 | 5/2002 | Carson et al. |
| 2002/0125500 A1 | 9/2002 | Mattausch et al. |
| 2002/0168100 A1 | 11/2002 | Woodall |
| 2003/0014240 A1 | 1/2003 | Navoni et al. |
| 2003/0055799 A1 | 3/2003 | Starzyk |
| 2003/0194124 A1 | 10/2003 | Suzuki et al. |
| 2003/0229636 A1 | 12/2003 | Mattausch |
| 2004/0080973 A1 | 4/2004 | Ogura |
| 2004/0123071 A1 | 6/2004 | Stefan et al. |
| 2004/0156546 A1 | 8/2004 | Kloth |
| 2004/0250013 A1 | 12/2004 | Ogura |
| 2005/0154802 A1 | 7/2005 | Kravec et al. |
| 2005/0257025 A1 | 11/2005 | Spencer |

OTHER PUBLICATIONS

Neschen, M., "Cumulus—A Scalable Systolic Array for Binary Pattern Recognition and Networks of Associative", LIX Technical Report, pp. 1-13, 1993.*
Mostafavi et al., M., "A Parallel Processor ASIC for Real Time Pattern Recognition", IEEE, pp. 306-309, 1990.*
Shmerko et al., V., "Algorithms of Boolean Differential Calculus for Systolic Processors", Kibernetika, No. 3, pp. 31-40, May-Jun. 1990.*
Chu et al., K., "VLSI Architectures for High Speed Recognition of Context-Free Languages and Finite-State Languages", IEEE, pp. 43-49, 1982.*

(Continued)

*Primary Examiner* — Jeffrey A Gaffin
*Assistant Examiner* — Adrian Kennedy
(74) *Attorney, Agent, or Firm* — Kilpatrick Townsend & Stockton LLP; Kenneth R. Allen

(57) ABSTRACT

A general purpose set theoretic processor is enhanced 1) by providing multi-function counters in stead of down-counters, 2) by internalizing the composite Boolean Logic function by introducing a two stage (two matrix) programmable composite Boolean Logic functionality wherein the first stage yields logical products of selected aggregation logic responses (or their complements) and the second stage yields logical sums of selected sets of those logical products, and 3) by providing internal selective re-initialization by means of a re-initialization routing matrix functionality that directs logical sums of Composite Boolean Logic sums of products to selected GPSTP cells to be re-initialized.

14 Claims, 10 Drawing Sheets

OTHER PUBLICATIONS

Johnsson et al. S., "Matrix Multiplication on Boolean Cubes Using Generic Communication Primitives", Yale, pp. 1-50, Sep. 1987.*

Manner et al., R., "Real-Time Pattern Recognition by Massively Parallel Systolic Processors", pp. 1-18, Nov. 23, 1995.*

Genov, et al., "Kerneltron: Support Vector Machine in Silicon", IEEE Transactions on Neural Networks, vol. 14, No. 5 (Sep. 2003), pp. 1426-1433.

Genov, et al., "Silicon Support Vector Machine with On-Line Learning," International Journal of Pattern Recognition, vol. 17 No. 3, World Scientific Publishing Company (2003), pp. 385-404.

Hasan et al., "A VLSI BAM Neural Network Chip for Pattern Recognition Applications," 1995 IEEE International Conference on Neural Networks Proceedings, IEEE, Part vol. 1, New York, NY (1995), pp. 164-168.

Kurogi, et al., "Multilayered and Columnar Competitive Networks for Spoken Word Recognition," Proceedings of the 19th International Conference on Neural Information Processing (ICONIP'02), vol. 5, Wang, et al., Editors (2002), pp. 2223-2227.

Matshubishi, et al., "A Vector Digital Signal Processor LSI for Speaker-Independent Voice Pattern Matching," IEEE 1991 Custom Integrated Circuits Conference (1991), pp. 16.4.1-14.4.4.

Ogawa, et al., "A General-Purpose Vector-Quantization Processor Employing Two-Dimensional Bit-Propagating Winner-Take-All," 2002 Symposium on VLSI Circuits, Digest of Technical Papers, IEEE, Piscataway, NJ (2002), pp. 244-247.

Stormon, "The Coherent Processor TM an Associative Processor Architecture and Applications," COMPCON Spring'91, Digest of Papers, IEEE Cput. Soc. Press, Los Alamitos, CA (1991), pp. 270-275.

Tsai, et al., "Optimal Speed-Up Parallel Image Template Matching Algorithms on Processor Arrays with a Reconfigurable Bus System," Computer Vision and Image Understanding, vol. 71, No. 3 (1998), pp. 393-412.

Yamashita, et al., "An Integrated Memory Array Processor with a Synchronous-DRAM Interface for Real-Time Vision Applications," Proceedings of the 13th International Conference on Pattern Recognition, IEEE Comput. Soc. Press, Part vol. 4, Los Alamitos, CA (1996), pp. 575-580.

* cited by examiner

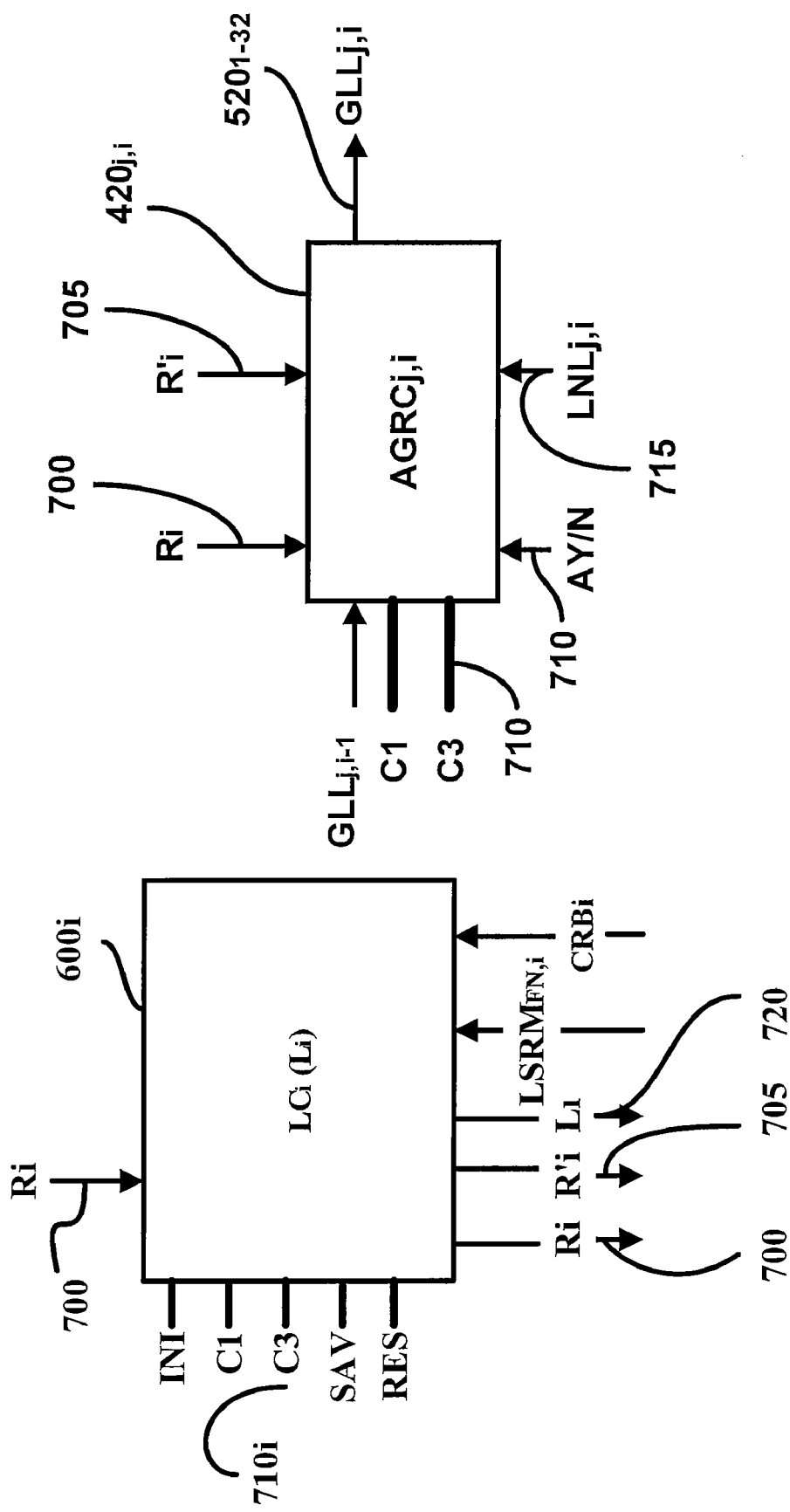

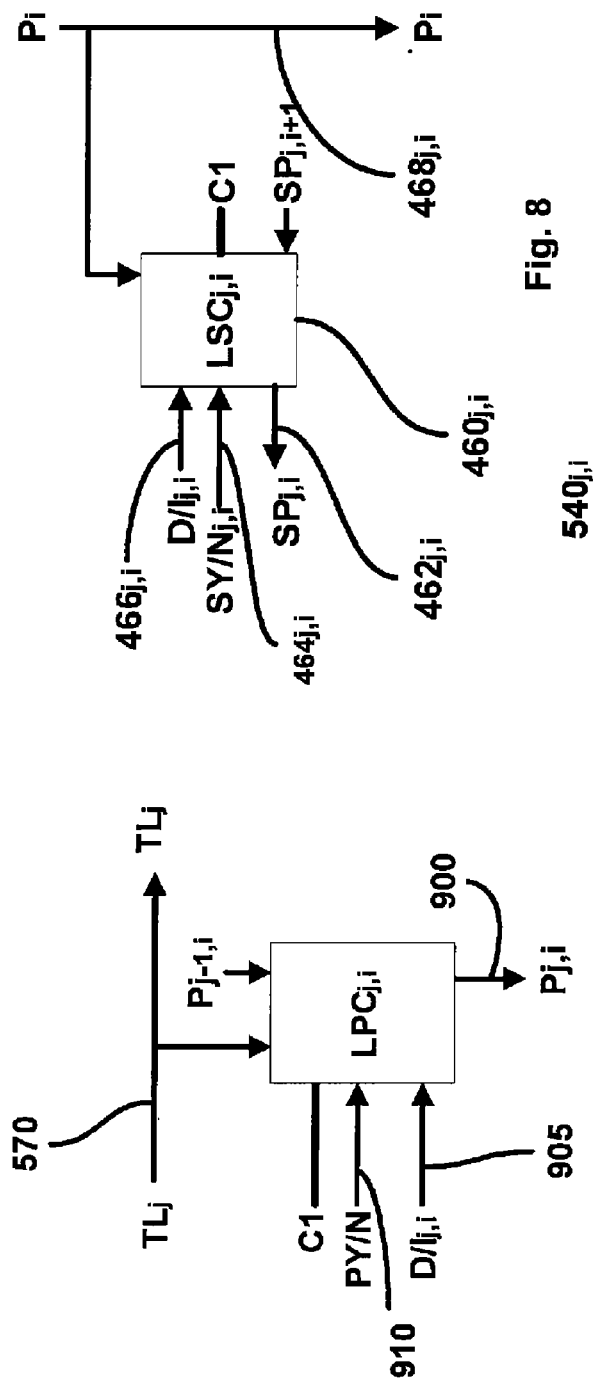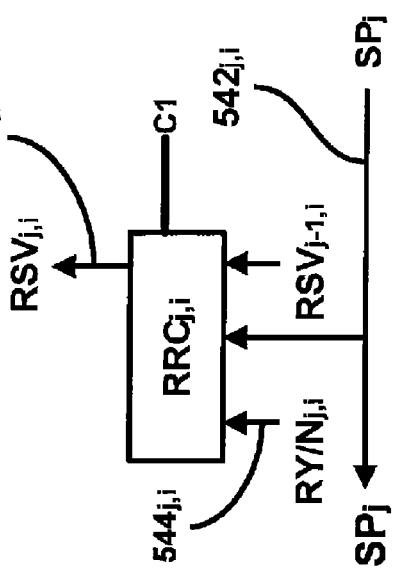

GPSTP WITH ENHANCED AGGREGATION FUNCTIONALITY

CROSS-REFERENCES TO RELATED APPLICATIONS

The present application claims benefit under 35 USC 119 (e) of U.S. provisional Application No. 60/829,474, filed on Oct. 13, 1006, entitled "ENHANCED AGGREGATION FUNCTIONALITY," the content of which is incorporated herein by reference in its entirety.

The present application is related to and incorporates the contents of the following US patent by reference in its entirety and which is not to be considered to be prior art: U.S. Pat. No. 7,392,229 based on U.S. application Ser. No. 11/353,318, entitled "General Purpose Set Theoretic Processor", filed Feb. 13, 2006.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to improvements in a general purpose set theoretic processor (GPSTP) as hereinafter defined. A GPSTP is a systolic (i.e., stimulus-response) processor consisting of N Building Block Modules (BBM's) each of which is itself a systolic processor. The present invention affects each of the BBM's internally and has no effect on the overall structure. Each of the BBM's has two major components; a Recognition Network and an Aggregation Network. They are controlled by an external Stimulus-Response Sequencer. More specifically, a GPSTP as described in the co-pending patent application includes at least one GPSTP building block module that comprises three components, a Recognition Network, an Aggregation Network and a Sequencer. In operation in its so-called scan mode, the Recognition Network generates a substantially amplified response, such as a 1024 bit response, for every input quantum (e.g., byte.). The Aggregation Network has two components, an Aggregation Routing Matrix component and a Threshold Logic component. The Aggregation Routing Matrix directs selected bits of the Recognition Network to selected Threshold Logic Units in the Threshold Logic component where they are counted. The Sequencer provides control signals for the other components. A GPSTP as described in the co-pending patent application is an advance in overcoming barriers to solving problems in complex and difficult pattern recognition, such as face-recognition suitable for surveillance, detection and the like; in real-time, multiple anonymous-speaker, continuous speech, multiple-language understanding in noisy environments and in understanding threat related content (encoded or not); content recognition and retrieval of pertinent digital information in text, sound, graphics, and video domains in real-time; and in detecting equipment failure precursor behaviors. The applications are widespread and often specialized, rendering the need for improvements in the basic general purpose set theoretic processor.

First, the basic GPSTP as originally conceived provided for one-way counters to aggregate simple, fragmentary responses to elementary stimuli. However, such counters could only decrement from an initial value and generate an output signal if they reach zero. Such "down-counters" are useful merely as threshold logic devices. However, it has now been determined that there are many problems that require counting responses for other purposes for which "down counters" are ill-suited. Improvement is needed.

Second, adequate handling of Boolean Logic is not as simple as it might seem. Although threshold logic performs a great deal of what would otherwise be performed by the Boolean Logic, the sorts of problems addressed by the GPSTP require resolution of logic expressions employing numerous logical variables. The embodiment described in U.S. Pat. No. 7,392,229, envisions thirty two variables and employs a relatively straightforward approach: as a part of Reference Pattern compilation a canonical sum-of-products truth table is derived. The truth-table is loaded into a $2^{32} \times 1$ bit random access memory (RAM) using the binary representation of the variables' truth-valuations as an index to store the truth-value of the expression. Evaluating the composite truth value of a stimulus response is a matter of using the binary representation of the truth-values of the response component variables to index the truth-value of the composite. This operation can be performed very rapidly and requires only one memory access. If the fastest memory available at a given point in time is used, then, for this configuration, there is no faster way at that given point in time.

However, there were practical limitations based on then-extant technology. The magnitude of $2^{32}$: $2^{32}=4,294,967,295$, four times the capacity of any memory chip available in early 2006, also four times the capacity of IC chips available to implement the GPSTP on a single chip. Given the state of the art, it was impossible to implement a GPSTP with on-board Composite Boolean Logic. Of the several unfortunate consequences of an external Composite Boolean Logic is that its outputs cannot easily be used by the GPSTP without degrading speed performance.

The third issue is intimately intertwined with the problems arising from external Composite Boolean Logic, so that it cannot be resolved if a way cannot be found to realize a GPSTP with on-board Composite Boolean Logic. This problem, for which a solution is described more fully hereinafter, is how to provide a mechanism for the GPSTP to re-initialize selected portions of itself when a set of stimuli is perceived by the GPSTP itself to signify a change of context. To appreciate the importance of being able to recognize and to act on changes in context as well as content, consider an application in which a GPSTP is used to recognize complex behaviors that precede system failures and signal control elements so they can prevent a system failure. One of many precursor patterns that must be concurrently monitored consists of 1) A frame formed by two triads of stimuli falling within individual limits in a given order: this frame forms a context in which the indicators of may occur. An indicator of looming failure is a string of stimuli with a series of ranges of values that must occur in a given order followed by a string of unknown length of stimuli whose values and order are of no significance followed by a series of stimuli with specific values but in any order. Moreover, a stream of stimuli meeting these criteria must occur within a frame. In order to avoid the satisfaction of only two of the three criteria occurring in one frame, and the third in another frame, the GPSTP must be able to re-initialize the cells participating in finding stimulus strings that meet the sets of criteria. However, the task of recognizing changes of context, boundaries, and frames is one that requires the same facilities as finding qualifying sequences within a context defining boundaries or frames. It would be unfortunate to have to perform context recognition in a host system rather than in the GPSTP concurrently with recognition of qualifying content.

These three issues provide opportunities for aggregation functionality improvement and are addressed by the present invention.

SUMMARY OF THE INVENTION

According to the invention, a general purpose set theoretic processor (GPSTP) is enhanced 1) by providing multi-function counters for down-counters, 2) by internalizing the composite Boolean Logic function by introducing a two stage (two matrix) programmable composite Boolean Logic functionality wherein the first stage yields logical products of selected aggregation logic responses (or their complements) and the second stage yields logical sums of selected sets of those logical products, and 3) by providing internal selective re-initialization by means of a re-initialization routing matrix functionality that directs logical sums of Composite Boolean Logic sums of products to selected GPSTP cells to be re-initialized.

The invention described herein provides three new components added to the Aggregation Network of a GPSTP: a Logical Products Array, a Logical Sums Array, and a Re-Initialization Routing Matrix, as well as enhancements to the Detection Cell (in the Recognition Network), the Aggregation Routing Cell, and the Threshold Logic Cell (both in the Aggregation Network). According to one aspect of the present invention, down-counters are replaced in the GPSTP with counters that can count up as well as down and that can either stop when the count reaches zero or can continue counting. These functions are selectable by the user. The "Count-Down-to-Zero" counters in the Threshold Logic component provide a powerful complement to the ordinal position logic implicit in the Recognition Network and the Composite Boolean Logic. The present invention provides that flexibility and data pathways to pass intermediate and final counter values to the Host Device Interface. In addition, the number of bits in the counters is increased from 10 to 32.

Still further according to the invention, a Composite Boolean Logic component is implemented on and integrated with a circuit chip carrying a fully functional GPSTP module, the component being used for logical combinations of results not related to re-initialization.

Further according to the invention, a technique is provided for context-triggered re-initialization of selected states of a GPSTP and also implemented on the same chip as the GPSTP itself.

The invention will be better understood by reference to the following detailed description in connection with the accompanying drawings.

BRIEF DESCRIPTION OF THE DRAWINGS

FIG. 3 is an input-output diagram of a Latch Cell
FIG. 4 is an input-output diagram of an Aggregation Routing Cell.

FIG. 7 is an input-output diagram of a Logical Product Cell.
FIG. 8 is an input-output diagram of a Logical Sum Cell.
FIG. 9 is an input-output diagram of a Re-Initialization Routing Matrix.

DETAILED DESCRIPTION OF THE INVENTION

Figure 1:
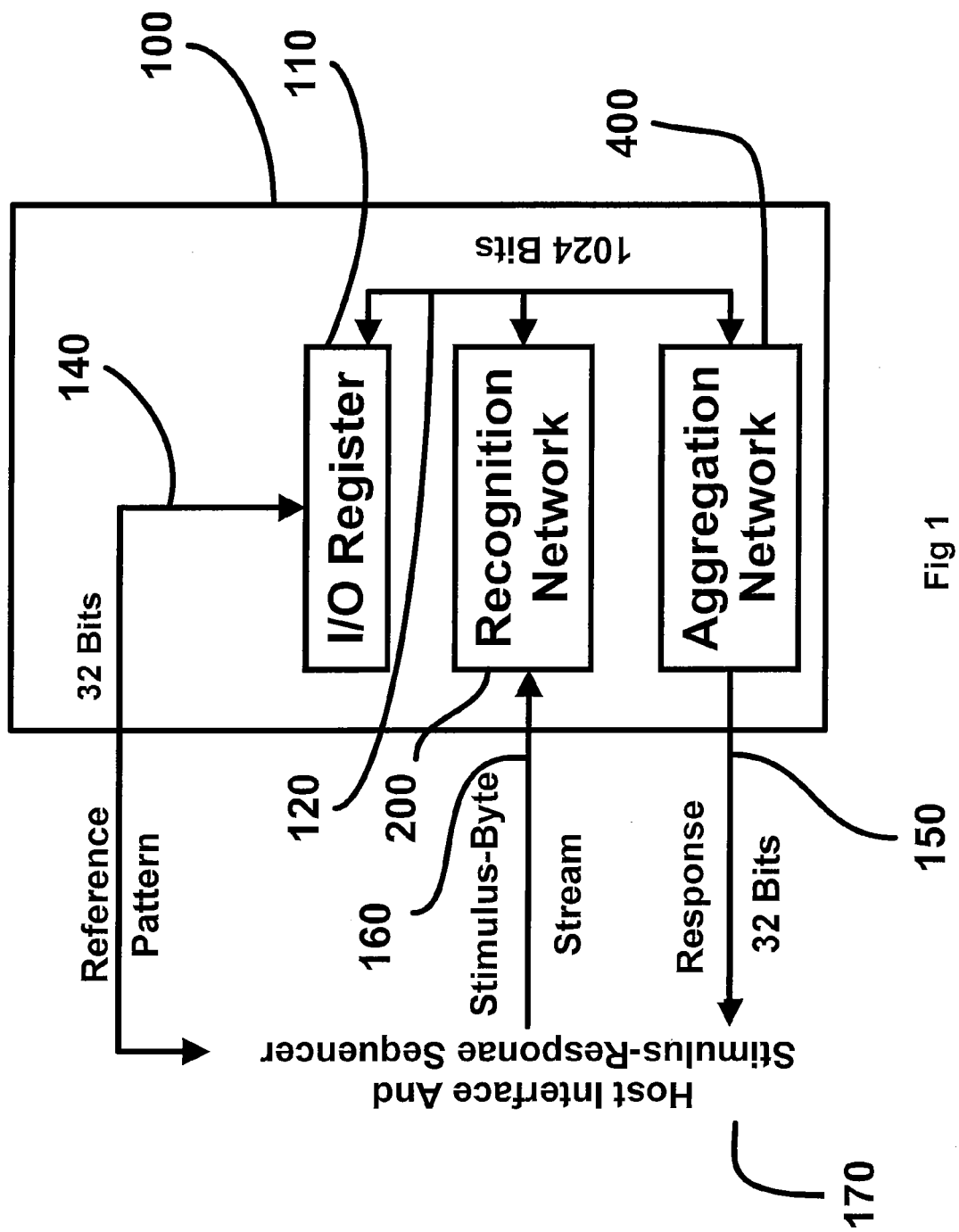
FIG. 1 is a block diagram of the GPSTP.

FIG. 1 is a block diagram of the GPSTP 100. As shown in the figure, the GPSTP comprises two subsystems, a Recognition Network 200 and an Aggregation Network 400.

Figure 2A:
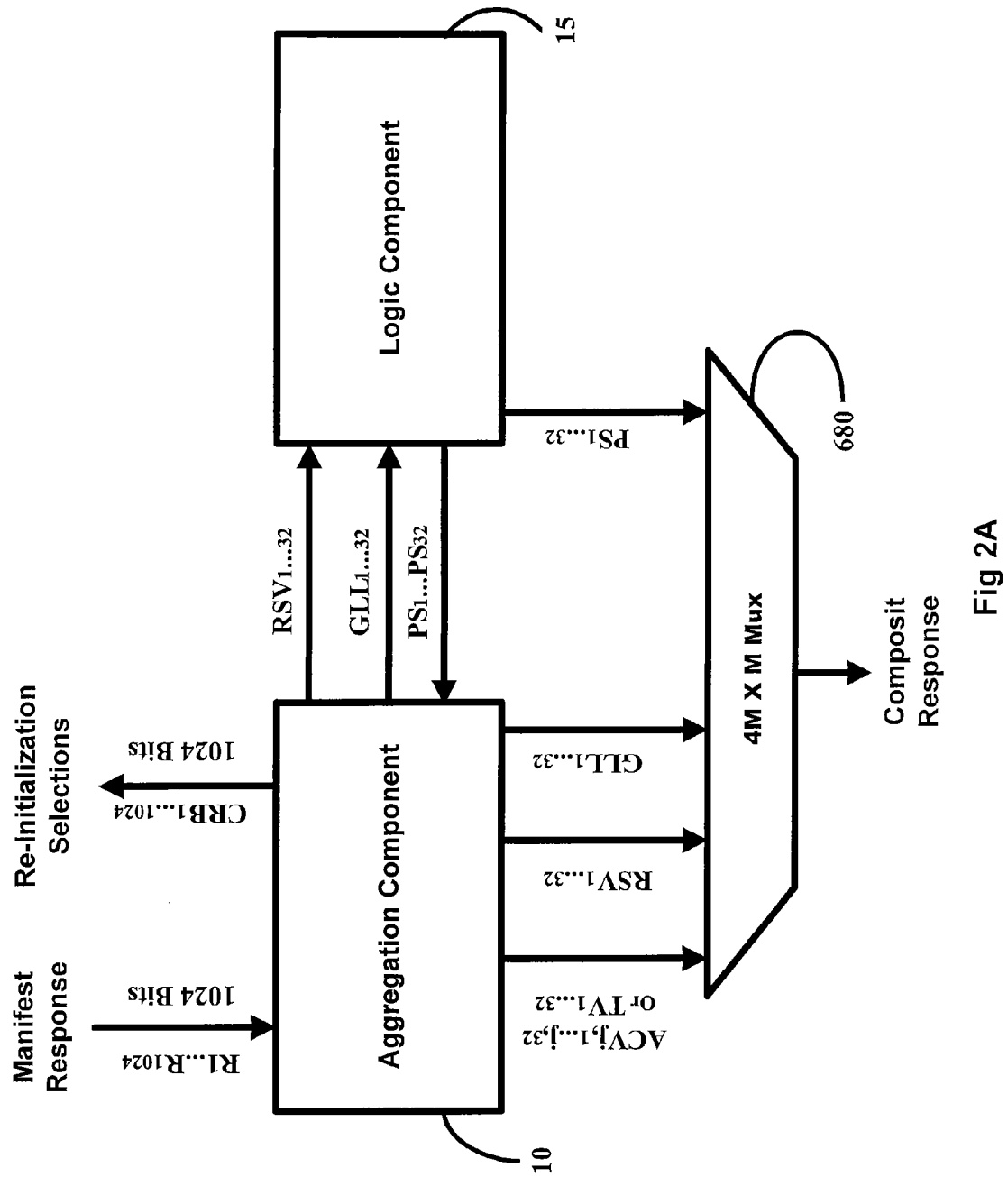
FIGS. 2a, 2b and 2c comprise a block diagram of an Aggregation Network.
Figure 2B:
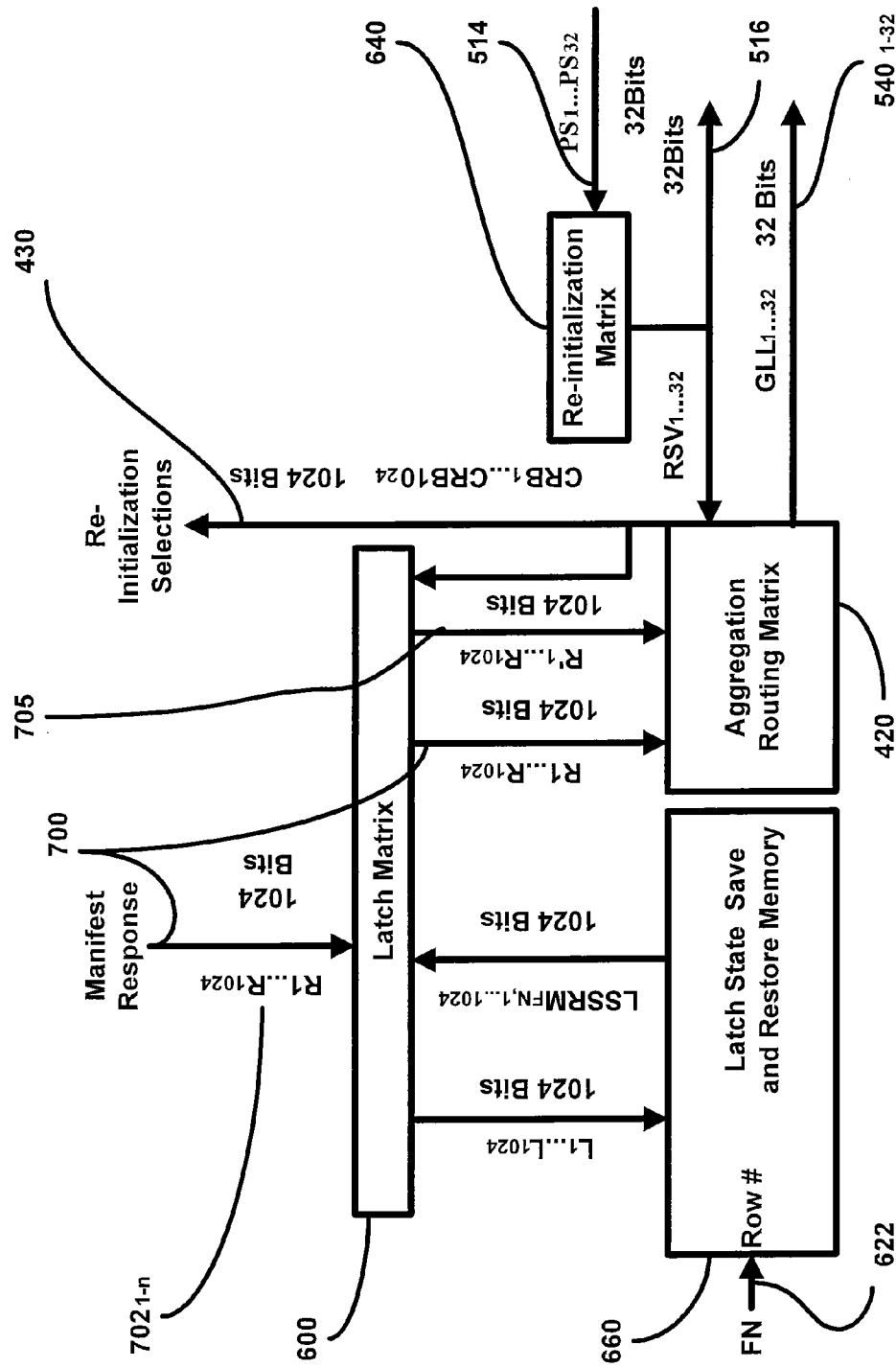
Figure 2C:
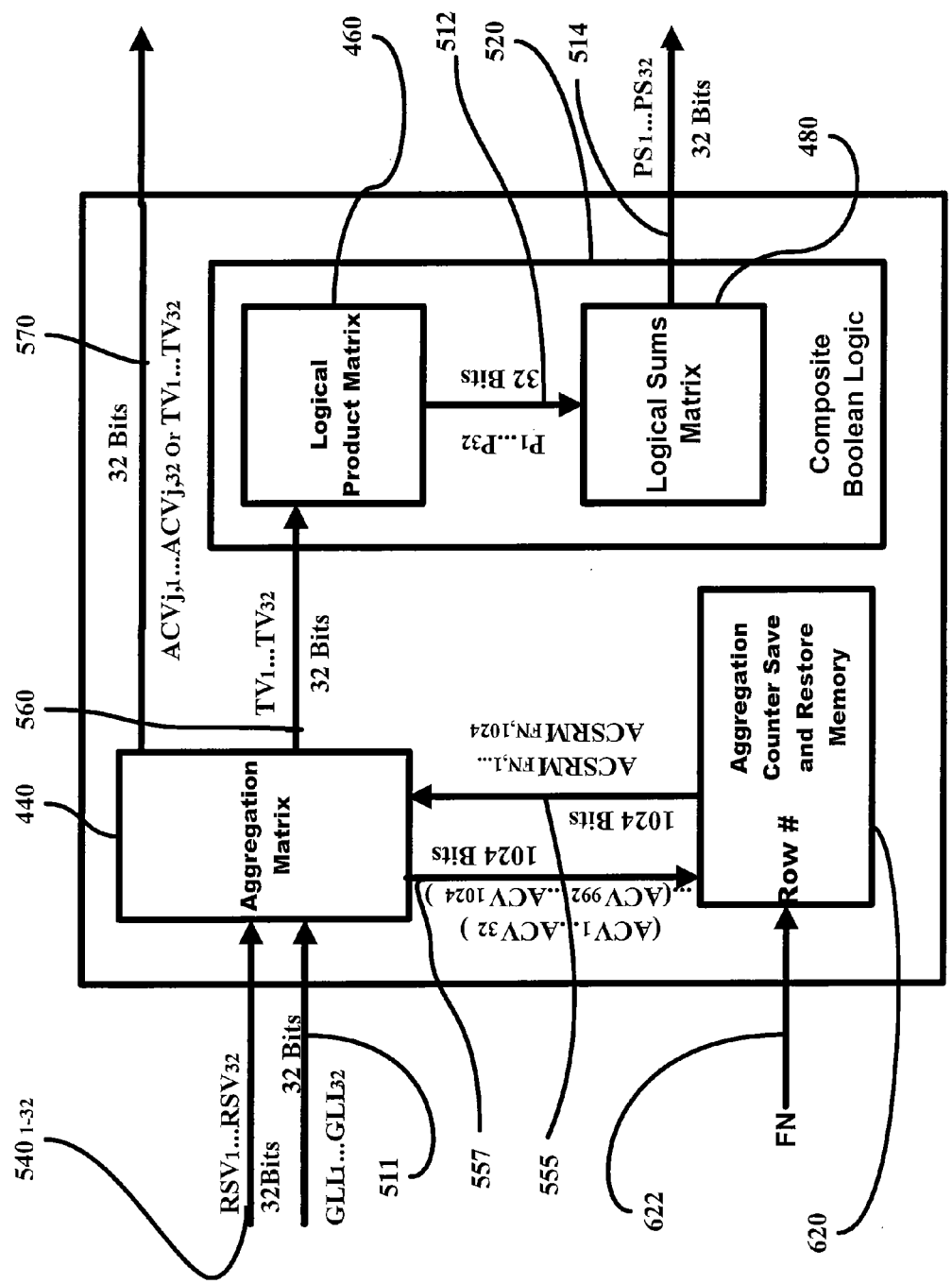

FIGS. 2a, 2b and 2c comprise a block diagram of an Aggregation Network 400. An example is described more thoroughly in U.S. Pat. No. 7,392,229. The system comprises in principal elements an Aggregation Routing Matrix 420, a Aggregation Matrix 440; a Logical Products Matrix 460 and a Logical Sums Matrix 480 of a Composite Boolean Logic component 520, Re-Initialization Routing Matrix 640, and a response selection multiplexer 680. According to the present invention, seven of these are new structures to the Aggregation Network 400, namely, a Latch Matrix 600, the Logical Products Matrix 460, the Logical Sums Matrix 480, the Re-Initialization Routing Matrix 640, the Response Selection Output Multiplexer 680, a Latch State and Restore Memory 660, and a Aggregation Counter Save and Restore Memory. 620. (Neither of the save and restore memories affects or is relevant to the present invention.) FIGS. 2a, 2b and 2c comprise a block diagram of an Aggregation Network 400. An example is described more thoroughly in U.S. Pat. No. 7,392, 229. The system comprises in principal elements an Aggregation Routing Matrix 420, a Aggregation Matrix 440; a Logical Products Matrix 460 and a Logical Sums Matrix 480 of a Composite Boolean Logic component 520, Re-Initialization Routing Matrix 640, and a response selection multiplexer 680. According to the present invention, seven of these are new structures to the Aggregation Network 400, namely, a Latch Matrix 600, the Logical Products Matrix 460, the Logical Sums Matrix 480, the Re-Initialization Routing Matrix 640, the Response Selection Output Multiplexer 680, a Latch State and Restore Memory 660, and a Aggregation Counter Save and Restore Memory. 620. (Neither of the save and restore memories affects or is relevant to the present invention.)

Referring to FIG. 3, a Latch Matrix 600 comprises a plurality of Latch Cells $600_1 \ldots {}_{1024}$ as illustrated and as described in U.S. patent application Ser. No. 11/353,318. Each Latch Cell $600_i$ has a state bit $L_j$ $720i$ that is reset to "1" by $CBR_j$ $430_j=1$, which occurs when any of the associated Aggregation Routing Cells $AGRC_{j,1 \ldots 32}$ is selected by the re-initialization selection mechanism.

Referring to FIGS. 2a, 2b, 2c and 4, the Aggregation Routing Matrix 420 is a rectangular array of Aggregation Routing Cells ($AGRC_{j,i}$) $420_{j,i}$. According to the present invention, each $AGRC_{j,i}$ $420_{j,i}$ has switches $Y/N_{j,i}$ $710_{j,i}$ and $LNL_{j,i}$ $715_{j,i}$ that respectively determine whether $AGRC_{j,i}$ $420_{j,i}$ connects $DC_i$ $230_i$ (FIG. 11) to aggregation cell $AGC_j$ and whether every non-zero response $R_i$ $702_i$ or only the first response $R_i$ $705_i$. The former non-zero response causes every occurrence of a response (or responses) to be counted, the later causes occurrence of unique responses to be counted.

Figure 5:
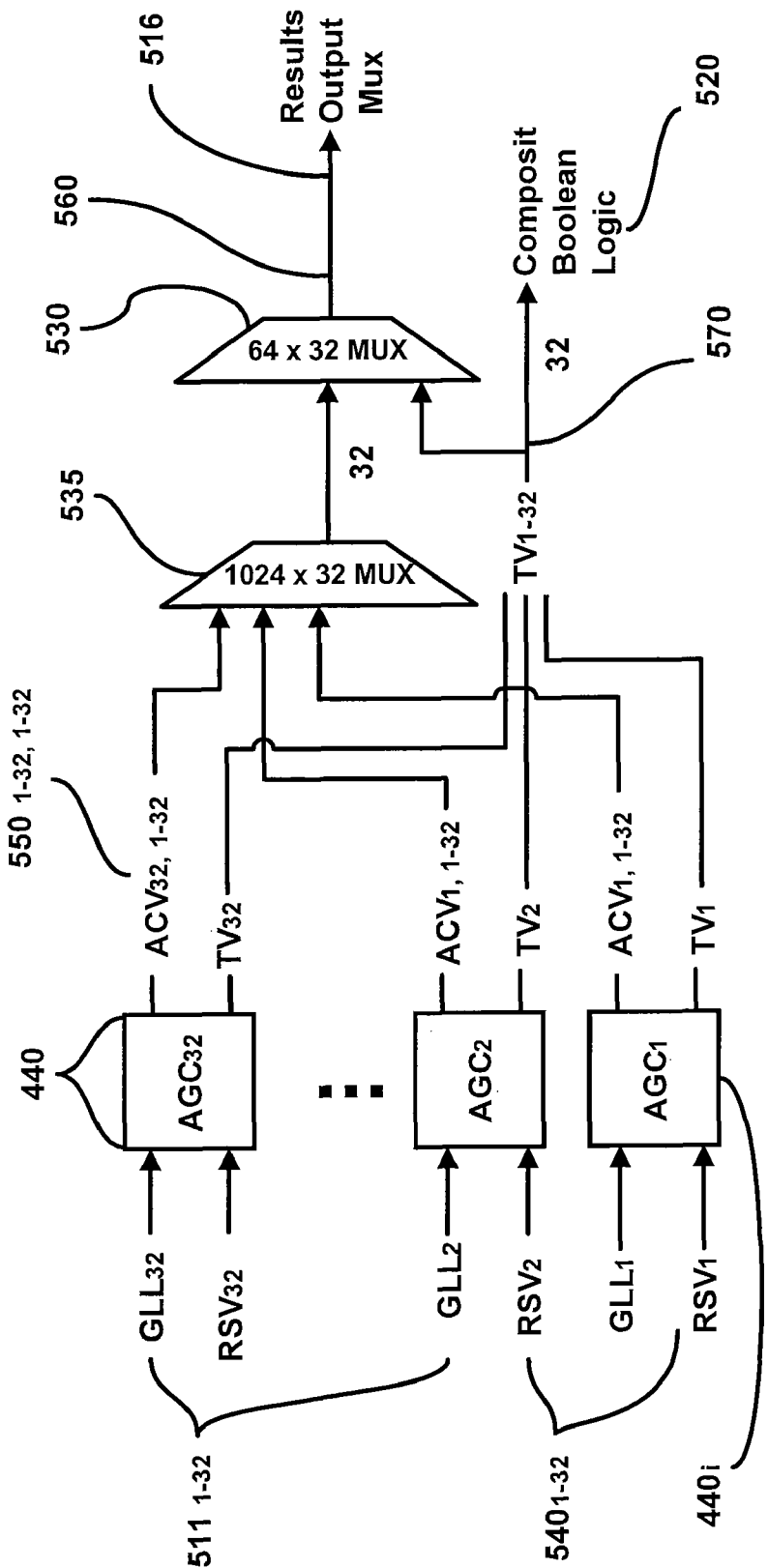
FIG. 5 is block diagram of an Aggregation Matrix.

Referring to FIG. 5, the Aggregation Matrix (AGM) 440 is shown. The AGM 440 comprises a plurality of AGM Cells $440_{1-n}$. According to the present invention, two multiplexers 535 and 530 are added to the AGM 440. Multiplexer 535 allows selection of the 32 bit current value $AGCV_{j,1-32}$ of one of the Aggregation Counters $AGC_j$. Multiplexer 530 that allows selection of either the current counter value selected by multiplexer 535 or the bits comprising the outputs TV1 . . . 32 of all of the AGCs 440. The selection is routed to the Response Selection Multiplexer 680 (FIG. 2).

Figure 6:
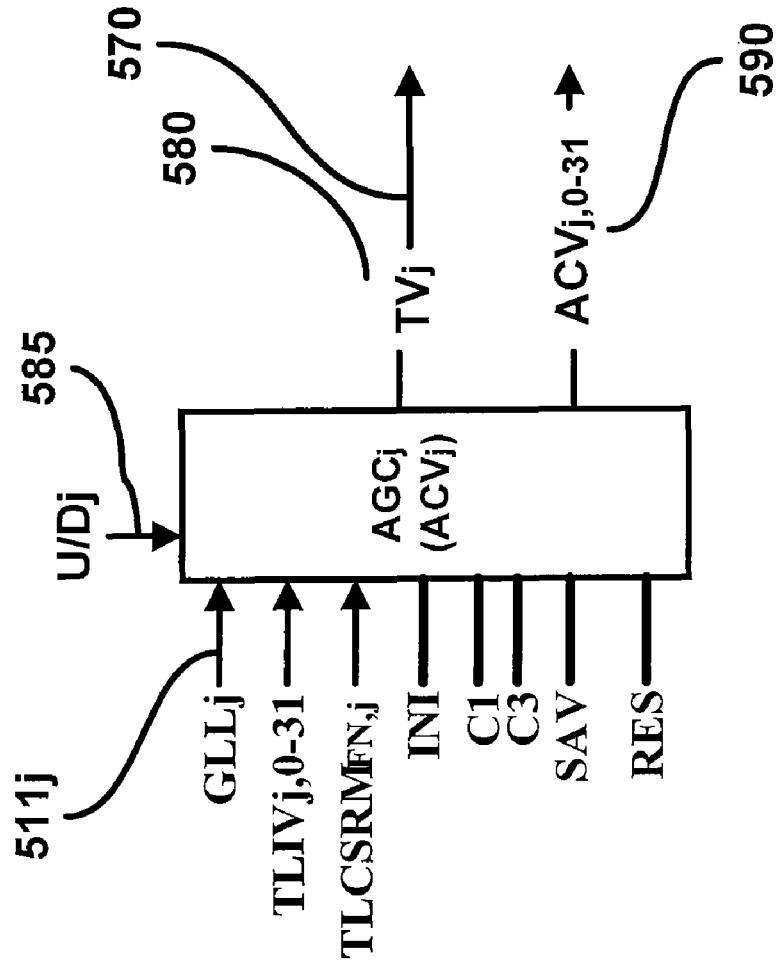
FIG. 6 is an input-output diagram of an Aggregation Cell.

Referring to FIG. 6, each AGM Cell 420$i$ according to the invention is a multi-function counter. These AGM Cells $420_{1-n}$ retain the count-down to zero functionality and add fcount up to $2^n-1$ functionality, the maximum possible counts in the counter. The number n of bits in the counters is 32, so their maximum value is 4,294,967,295. The switch U/Dj 585 determines the direction of the count. It is necessary that these multi-function counters count from the selected threshold and stop when they reach their upper and lower limits and not roll over in order for the processor to serve its proper function Referring to FIG. 2 and FIG. 7, the Logical Products Matrix 460 is an n×n reticulum of Logical Product Cells $460_{1-n}$, where n is the number of Group Logic Lines 511 1–n in the Aggregation Network 400. An input-output diagram of a single Logical Products Cell 462$i$ is shown in FIG. 7; its behavior is determined by the logic equation:

$$P_{j,i} \leftarrow (P_{j-1,i} \& C1) \& (\sim PY/N_{j,i} V(PY/N_{j,i} \& ((TV_j \& D/C_{j,i}) V(\sim TV_j \& \sim D/C_{j,i}))))$$

Where $P_{j-1,i}$ is the logical product of the preceding logical product cells, $PY/N_{j,i}$ is a switch that determines if $TV_j$ participates in the product, $D/I_{j,i}$ determines whether $TV_j$ or $\sim TV_j$ participates.

The Logical Sums Matrix 480 is an n×n reticulum of Logical Sum Cells $482_i$, (FIG. 8) where n is the number of Group Logic Lines $511_{1-n}$ in the Aggregation Network 400. FIG. 8 is an input-output diagram of a single Logical Sum Cell; its behavior is determined by the logic equation:

$$SP_j \leftarrow SP_{j,n+1} V((C1 \& SY/N_{j,i}) \& ((P_i \& D/I_{j,i}) V(\sim P_i \& \sim D/I_{j,i})))$$

Where $SP_{j,i+1}$ is the logical sum $P_{j,n} VP_{j,n-1} V \ldots P_{j,i+2} V P_{j,i+1}$, $SY/N_{j,i}$ is a switch that determines if logical product $P_i$ will participate in the sum, $D/I_{j,i}$ is a switch that determines whether $P_{i,j}$ or $\sim P_i$ participates.

The Re-Initialization Routing Matrix 640 is an n×n reticulum of Re-Initialization Routing Cells $502_{1-n}$, where n is the number of Group Logic Lines $511_{1-n}$ in the Aggregation Network 400. FIG. 9 is an input-output diagram of a Re-Initialization Routing Cell $502_i$; its behavior is determined by the logic equation:

$$RSV_i \leftarrow RSV_{j-1,i} V(C1 \& RY/N_{j,i} \& SP_i)$$

Where $SP_i$ is the output of row i of the Logical Sums Matrix, $RSV_i$ is the output of Re-initialization Routing Cell j–1,i and $RY/N_{j,i}$ is a switch that determines if logical sum $SP_i$ will participate in the reinitialization.

Figure 10:
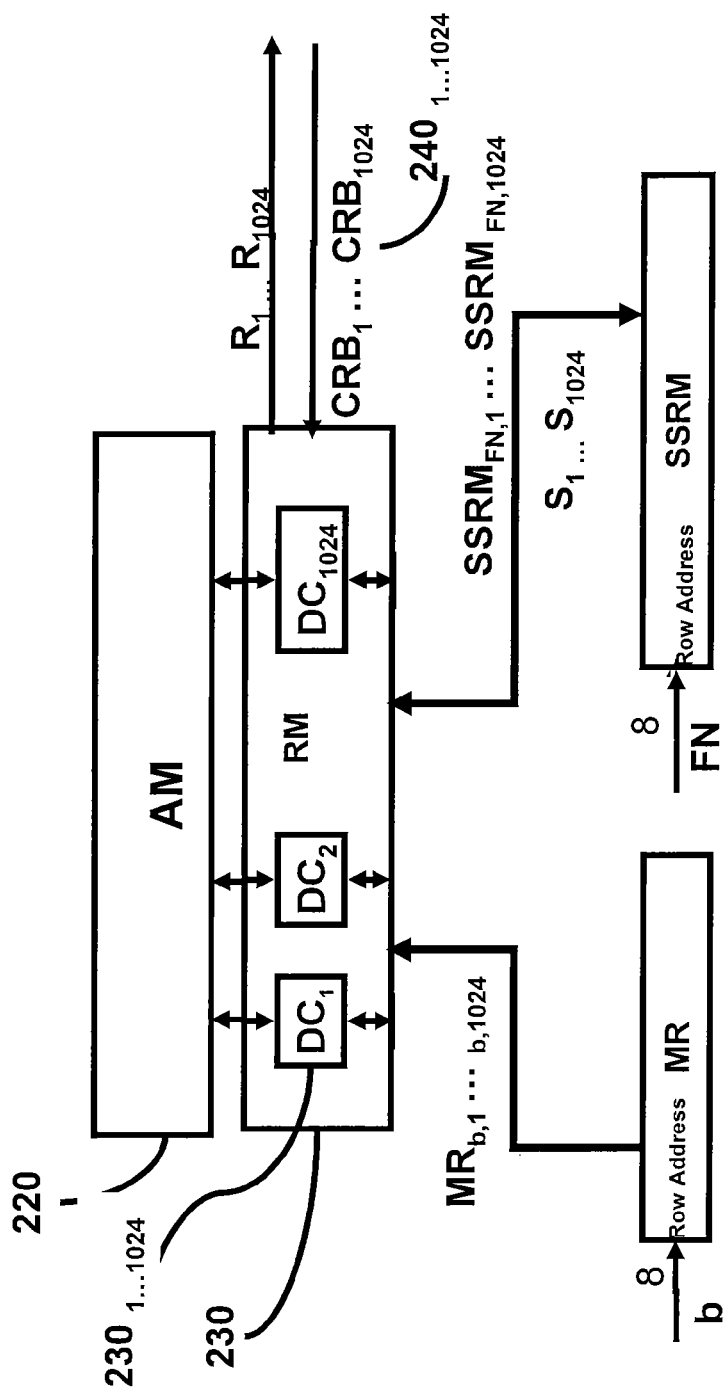
FIG. 10 is a block diagram of a Recognition Network.

FIG. 10 is a block diagram of a Recognition Network 200 showing various elements around and focused on a Recognition Matrix 230. The Recognition Matrix 230 is a reticulum of Detection cells 230 1 . . . 1024.

Figure 11:
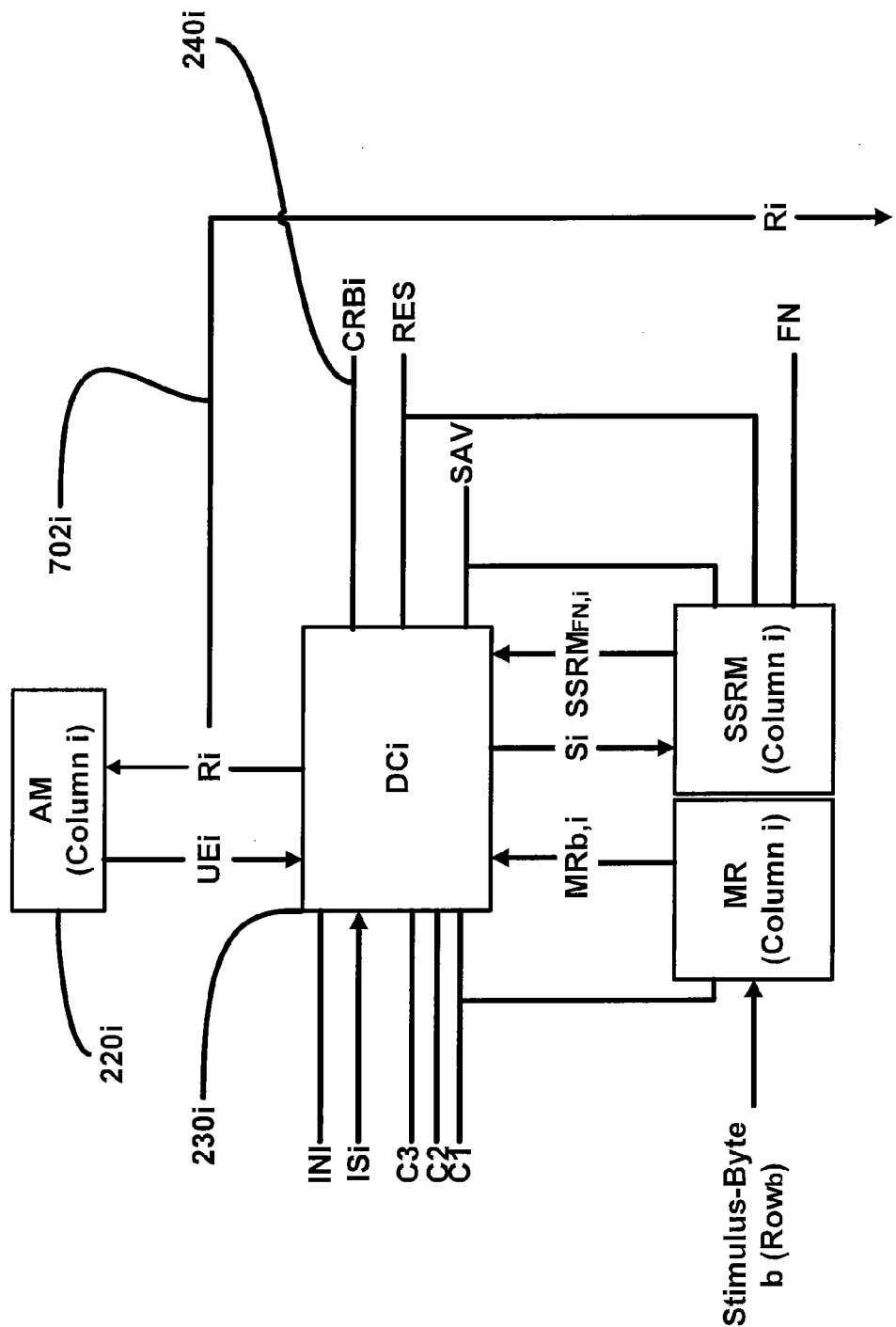
FIG. 11 is a block diagram of a "slice" of a Recognition Network Showing a Detection Cell and the related column from each of a latent response memory, State Save and Restore Memory, and Activation Matrix

FIG. 11 is a block diagram of a "Slice" of a Recognition Network showing a Detection Cell DC, 230, with all of it inputs and outputs. In this embodiment there are 1024 such Detection Cells 230, Re-initialization behavior is determined by the logic equation:

$$S_i \leftarrow CRB_i \& ISi \& C3$$

Where Si is the state of DCi, CRBi is its re-initialization bit, ISi is its initial state, and C3 is the clock signal that controls Selective re-initialization.

The Host Device Interface-Stimulus Response Sequencer (HDI-SRS 5) incorporates an industry standard interface to connect to host devices. The HDI-SRS 170 interfaces with the Recognition Network 200 via an eight bit unidirectional data bus 160, a 32 bit bidirectional data bus 9, and an 8 bit bidirectional control bus 8. The HDI-SRS 170 interfaces with the Aggregation Network 400 via two 32 bit unidirectional data buses 10. The Recognition Network 200 and the Aggregation Network 400 communicate via a bidirectional bus of 1024 bits. The HDI-SRS 170 is connected to the Recognition Network 200, and Aggregation Network 400 by eight bit unidirectional control buses 12.

Within the Aggregation Network 400, the Aggregation Routing Matrix 420 is connected to the Aggregation Matrix 440 by a unidirectional 32-bit data bus 14. The Aggregation Matrix 440 is connected to the Composite Boolean Logic 520 by a unidirectional 32-bit data bus 16 and to the Results Output Multiplexer (MUX) 680 by a unidirectional 32-bit data bus 18. The Composite Boolean Logic 520 is connected to the Re-Initialization Routing Matrix by a unidirectional 32-bit data bus 20. The MUX 680 is connected to the HDI-SRS 170 by a unidirectional 32-bit data bus 22.

Operation

The Stimulus-Response Process—The Stimulus-Response Process is substantially the same as the Source Data Scan Process described in U.S. patent application Ser. No. 11/353,318. In particular, the HDI-SRS 170 passes stimuli to the Recognition Network 200 one stimulus-byte) at a time to the Recognition Network 200. The Recognition Network 200 generates a 1024 bit Manifest Response ($R_{i-1024}$) $702_{1-n}$ as an output, which is passed to the Aggregation Network 400. In the Aggregation Network 400, the Aggregation Routing Matrix 420 directs the response subset (those bits that signal "term found") of the 1024 bit Recognition Network 200 reaction to Aggregation Cell $440_i$ (in the Aggregation Matrix 440). Each Aggregation Cell $440_i$ aggregates the responses directed to it by incrementing or decrementing its counter. Output from each Aggregation Cell $440_i$ is zero if the current value of the counter is greater than zero and one if the counter's value is zero. These (32 in the case of the preferred embodiment) values are passed to the Composite Boolean Logic, where in many applications they can be used as results. But in many other applications further logical transformations are necessary.

These transformations are carried out in the Composite Boolean Logic structure that comprises two n×n matrixes (32×32 in the preferred embodiment): the Logical Products Matrix and the Logical Sums Matrix.

When using Aggregation Cell $420_i$ as threshold detectors, the outputs of the (32 Bit) Aggregation Cell $420_i$ are the binary ones, that is, indicating whether each of the thresholds have been reached.

When using an Aggregation Cell 420 to count either the number of different terms fulfilled in logical group found in input data or the number of occurrences of strings from a logical group in input data, the current value of the counters.

In many scenarios of operation the GPSTP receives entities from a data stream in structural blocks (documents, messages, packets) that are carriers of information but that in themselves have no semantic meaning, except that their contents all "go together" in a manner that is presumably understood by both generators and consumers of the information. These blocks form boundaries both for selection and retrieval, that is, criteria for selection, based on a reference pattern, are to be satisfied within the boundaries of the block and the block is the unit to be retrieved. Tunable acuity requires syntactic/semantic boundaries. Since recognizing syntactic/semantic boundaries within a data entity is equivalent to perceiving content of interest, that task is preferably performed within the GPSTP rather than the host device. The invention described herein makes possible selective re-initialization of Detection Cell, Latch Cell, and Aggregation Cell states to their initial values when boundaries of interest are recognized.

The Logical Products Matrix allows Threshold Logic outputs or their logical complements to be conjoined in any desired combination. And it allows multiple conjunctive combinations up to the number of Threshold Logic outputs. The Logical Sums Matrix takes as its inputs the outputs of Logical Products Matrix. The Logical Sums Matrix allows disjunction of any combination of its inputs or their logical complements. And it allows multiple disjunctive combinations up to the number of Logical Products Matrix outputs. This two stage logic yields a sum of products transform of the Threshold Logic outputs. Outputs of the Composite Boolean Logic which, along with the raw Threshold Logic outputs, provide a comprehensive response to each source data input are passed to the Host Device Interface.

Much meaning is carried by the context in which a pattern is recognized. The Re-Initialization Routing Matrix provides a mechanism that allows context to be taken into account. In addition to recognizing substantive information relevant to the users' needs, the GPSTP can be used to recognize context boundaries (e.g., beginning and end of sentences, paragraphs, frames, XML expressions). The Re-Initialization Routing Matrix allows context recognitions to be mapped to Aggregation Routing Cells, Threshold Logic Cells, and Detection Cells that are reset to their initial values in response to context changes.

The Re-Initialization Routing Matrix structure is an n×n matrix of Re-Initialization Routing Cells. Each of these maps zero or more Logical Sums Matrix outputs to one row of Aggregation Routing Cells. Multiple mappings to a row are combined disjunctively (with a logical "OR").

The implementation of the various building blocks of the enhanced GPSTP is based on an application of the foregoing logic equations instantiated at the gate level. Various implementations are within the purview of those of ordinary skill in the art.

The invention has been explained with reference to specific embodiments. Other embodiments will be evident to those of ordinary skill in the art. It is therefore not intended that the inventions be limited, except as indicated by the appended claims.

What is claimed is:

1. A general purpose set theoretic processor comprising:
input/output;
a recognition network having a recognition matrix comprising detection cells and an aggregation network, the aggregation network having an aggregation matrix having aggregation cells;
composite Boolean Logic having two-stage programmable composite Boolean Logic functionality; and
a re-initialization routing matrix configured to be able to cause at least selected said aggregation cells to be re-initialized.

2. The processor according to claim 1 further including a latch matrix with latch cells and wherein said re-initialization routing matrix is further operative to re-initialize said latch cells of said latch matrix, detection cells of a recognition matrix of the recognition network and aggregation cells of the aggregation matrix of the aggregation network.

3. The processor according to claim 1 wherein said aggregation cells each comprises a multi-function counter configured to increment from a pre-selected value to a maximum and to decremen tfrom the pre-selected value to zero upon triggering by outputs from aggregation routing cells of the a aggregation routing matrix.

4. The processor according to claim 1 wherein the first stage of said composite Boolean Logic functionality in form of a logical product matrix comprises a two-dimensional matrix of selectable logical product cells and is operative to yield logical products of selected aggregation logic responses and wherein the second stage in form of a logical sums matrix comprises a two-dimensional matrix of selectable logical sum cells and is operative to yield logical sums of selected sets of said logical products.

5. A general purpose set theoretic processor having comprising:
input/output;
composite Boolean Logic in form of a logical product matrix having logical product cells;
a recognition network; and
an aggregation network having an aggregation routing matrix and an aggregation matrix, the aggregation routing matrix comprising aggregation routing cells and group logic lines and the aggregation matrix comprising a one-dimensional array of independently operating aggregation cells and composite Boolean Logic having a logical product matrix element;
wherein each one of said aggregation cells is a multi-function counter, said multifunction counter being configured to be capable of accepting detected pattern results from one group logic line and of incrementing from a first pre-selected value to a maximum and of decrementing from a second pre-selected value to zero to generate a sum of detected patterns; and
outputting the detected pattern sum to said logical product matrix.

6. In a general purpose set theoretic processor having input/output logic, recognition logic having detection cells and aggregation logic having aggregation cells and a latch matrix having latch cells, a method for changing states comprising:
in response to at least one of change of context and change of boundaries,
re-initializing states of selected detection cells;
re-initializing states of selected aggregation cells; and
reinitializing states of selected latch cells.

7. In a general purpose set theoretic processor having input/output logic and aggregation logic including aggregation cells coupled via group logic lines to aggregation routing cells, a method for detecting content and context of a body of data, the body of data comprising an information set including members composed of at least two of bytes, words, sentences and paragraphs, the method comprising:
conveying a number associated with each recognized pattern via said group logic lines to the aggregation cells;
detecting a preselected number of each of the recognized patterns that exceeds a threshold as conveyed via one of said group logic lines;
the detecting step applying to three operations comprising:
1) counting in the aggregation cells the number of occurrences of each individual recognized pattern within a specific context of the information set;
2) counting in the aggregation cells the number of unique recognized patterns in the information set; and 3) counting using the aggregation logic the number of intervening patterns between two content patterns, the intervening patterns being recognized patterns of a context and the content patterns being two recognized pattern other than the context recognized pattern.

8. The processor according to claim 4 wherein each logical product cell is adapted to be configured to perform one of the following operations:
   a) accept output of a group logic line to which it is connected,
   b) accept the complement of said group logic line,
   c) accept neither a) nor b) in order to be included in a logic expression of which it is a part; and
   each logical sum cell is adapted to be configured to perform one of the following functions:
   d) accept the output of a logical product line to which it is connected,
   e) accept the complement of said logical product line,
   f) accept neither d) nor e) in order to be included in the logic expression of which it is a part.

9. The processor according to claim 1, further having a latch matrix with latch cells and having an aggregation network having an aggregation routing matrix comprising group logic lines and aggregation routing cells each said aggregation routing cell being connected to output of a latch cell and configured to be capable of connecting to a group logic line, said group logic line being connected to an aggregation cell.

10. The processor according to claim 4 further including a re-initialization routing matrix comprising a two-dimensional array of selectable re-initialization routing cells, said re-initialization routing cells occupying nodes of said two-dimensional array, each of said re-initialization routing cells selectively connecting one row to one column of said two-dimensional array.

11. The processor according to claim 10 further having an aggregation routing matrix wherein all of said re-initialization routing cells on a single row of said two-dimensional array are connected to the output line of a single row of the logical sums matrix and the outputs of all said re-initialization cells on a single column of said two-dimensional array are connected to a single row of the aggregation routing matrix.

12. The processor according to claim 11 wherein each of said re-initialization routing cells has a selection switch, the selection switch being configurable to connect the output line of a first specified row of the logical sums matrix to the input line of a second specified row of the aggregation routing matrix.

13. The processor according to claim 11 wherein each row of the logical sums matrix is adapted to be connected to multiple columns of the aggregation routing matrix.

14. A general purpose set theoretic processor comprising:
   a recognition network having a recognition matrix, the recognition matrix comprising detection cells;
   a latch matrix comprising latch cells;
   an aggregation matrix comprising aggregation cells; and
   a re-initialization routing matrix comprising re-initialization routing cells, each of said re-initialization routing cells being in a conditional connection to one of said detection cells, one of said latch cells, and one of said aggregation cells.

* * * * *